Figure 1:
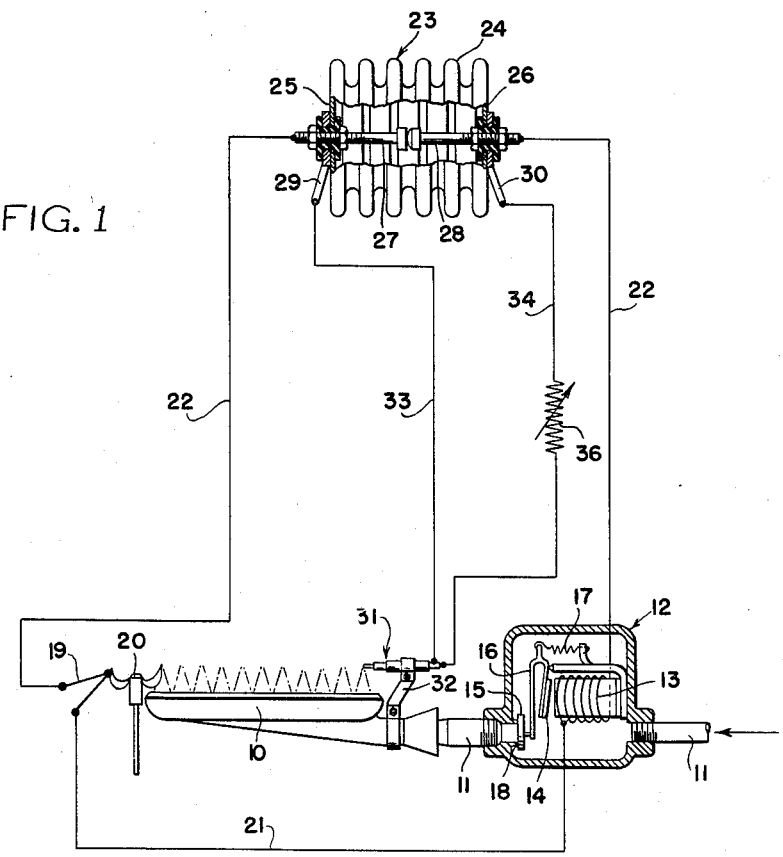

May 10, 1960 R. B. MATTHEWS 2,936,122
CIRCUIT-CONTROLLING DEVICE
Filed Nov. 25, 1955

INVENTOR.
RUSSELL B. MATTHEWS
BY *Seegert & Schwalbach*
ATTORNEYS

United States Patent Office 2,936,122
Patented May 10, 1960

2,936,122

CIRCUIT-CONTROLLING DEVICE

Russell B. Matthews, Wauwatosa, Wis., assignor to Baso Inc., Milwaukee, Wis., a corporation of Wisconsin Application November 25, 1955, Serial No. 548,968

1 Claim. (Cl. 236—9)

This invention relates to improvements in circuit controlling devices and more particularly to temperature responsive circuit controlling devices having particular utility in the control of low power circuits.

It is a general object of the present invention to provide an improved circuit controlling device having relatively movable contacts and means for actuating said contacts in response to changes in temperature, said device having a deformable electrically conductive member, for example a metallic expansible and contractible contact enclosure, and having means responsive to a predetermined condition for effecting the flow of electric current through said electrically conductive member for generation of heat to which said contact actuating means is responsive for actuation of said contacts.

Another object of the invention is to provide an improved circuit controlling device of the character described which takes the form of a thermostat for controlling the flow of fuel to fluid fuel burning apparatus, there being means in the form of a thermoelectric generator subject to the heat of burning fuel for effecting said current flow through the contact enclosure of said thermostat for generation of heat during operation of said apparatus, said heat providing heat anticipation for said thermostat.

A more specific object of the invention is to provide an improved circuit controlling device of the class described wherein the thermoelectric generator has at least one semi-metallic element.

Another specific object of the invention is to provide an improved thermostat of the class described wherein there is variable resistance means in circuit with the generator and the contact enclosure for selectively varying the amount of current flowing through said enclosure and thereby correspondingly varying the amount of heat generated and hence the amount of heat anticipation afforded to said thermostat.

Another specific object of the invention is to provide an improved thermostat which is highly sensitive and is particularly well adapted for the control of thermoelectric circuits, the contacts of said thermostat being insulatably mounted within the enclosure, and the enclosure being provided with a temperature responsive expansible and contractible volatile fluid fill for effecting expansion and contraction of the enclosure and thereby movement of the contacts in response to changes in temperature.

Figure 2:
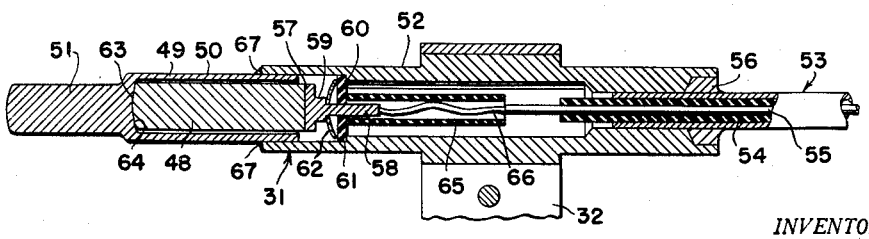

Other and further objects of the invention will become apparent as the description proceeds, reference being had to the accompanying drawing illustrating one embodiment of the invention wherein:

Figure 1 is a semi-diagrammatic view of a fluid fuel burning apparatus equipped with the improved circuit controlling device; and Figure 2 is an enlarged longitudinal sectional view taken through the generator subject to the heat of the main burner.

Referring more particularly to Figure 1 of the drawing which discloses a fluid fuel burning apparatus, the numeral 10 indicates a main burner supplied with fluid fuel under pressure through a supply conduit 11 in which is interposed a cycling type electromagnetic valve 12. The electromagnetic valve 12 has an operator comprising an electromagnet 13 and an armature 14 movable toward and away from the pole faces thereof and connected to a valve member 15 through a pivotally mounted reversely bent arm 16 which preferably includes a resilient energy storing portion. A spring 17 is connected to the arm 16 and biases the armature 14 away from the pole faces of the electromagnet 13 while at the same time biasing the valve member 15 toward its seat 18.

Means is provided for energizing electromagnet 13 to effect attraction of the armature 14 thereto and opening of the valve member 15 for fuel flow to the main burner, said means comprising a thermoelectric generator 19 having a hot junction subject to the heat of burning fuel at a pilot burner 20 mounted in igniting relation to the main burner 10 as shown. The generator 19 is connected in circuit with the terminals of the electromagnet 13 by conductors 21 and 22 as shown. Interposed in the conductor 22 in series circuit relation with the generator 19 and electromagnet 13, is a condition responsive circuit controlling device in the form of a thermostat 23 for cycling the valve 12 to permit or prevent fuel flow to the burner 10 in response to changes in the ambient temperature.

The thermostat 23 selected for illustration comprises an hermetically sealed enclosure in the form of a cylindrical bellows 24 having end walls 25 and 26 movable toward and away from each other with contraction and expansion of said bellows. The bellows 24 is preferably made of electrically conductive flexible resilient material, for example, relatively thin gauge brass. Cooperating low resistance contacts 27 and 28 extend through and are insulatably carried by the end walls 25 and 26 as shown, said contacts being of silver or other suitable low resistance material. The mounting for the contacts 27 and 28 may also provide for electrical connection of lugs 29 and 30 with the end walls 25 and 26 respectively. The bellows 24 preferably contains a thermally responsive expansible and contractible volatile fluid fill, for example pentane, which does not react with or in any way deleteriously affect the contacts 27 and 28 to create contact resistance. The bellows fill effects expansion and contraction of the bellows 24 in response to changes in ambient temperature to thereby produce circuit controlling changes in the contact resistance and cycling of the electromagnetic valve 12 for control of the flow of fuel to the main burner 10.

The thermostat 23 may be so constructed that the resilience of the bellows 24 biases the contacts 27 and 28 toward engagement with each other. It is preferred, however, to provide means (not shown) external to the bellows 24 and acting against one end wall thereof to bias the contacts 27 and 28 toward engagement, said means being provided with suitable adjustment to permit variation in the control point of the thermostat 23.

In the illustrated form of the invention, means is provided for effecting a flow of electric current through the bellows 24 from one end wall to the other for the purpose of generating heat and thereby affording the thermostat heat anticipation. To this end, a thermoelectric generator 31 of novel construction is mounted on a suitable bracket 32 in a position to have its hot junction subject to the heat of burning fuel at the main burner 10. The thermoelectric generator 31 preferably takes the form of a thermocouple having at least one semi-metallic element of a type to be more fully described hereinafter. The terminals of the generator 31, i.e. the lead conductors 54 and 55 thereof to be described hereinafter, are connected in circuit with the lugs 29 and 30 on the bellows 24, as by conductors 33 and 34 respectively. A variable resistance element 36 is interposed in the conductor 34 to provide selective adjustment of the amount of current from the generator 31 which can flow through the bellows 24, thereby selectively adjusting the amount of heat produced by said current and the amount of anticipation afforded to the thermostat.

Referring now to Figure 2 of the drawing, the thermoelectric generator 31 illustrated therein comprises a pair of thermocouple element means 48 and 49, the latter of which takes the form of an elongated generally cup-shaped sheath member, preferably of stainless steel. The sheath 49 has a tubular sleeve portion 50 and a tip portion 51 which may serve as a heat probe means for the assembly. The opposite end of the member 49 is telescopically received within a counterbore formed within one end of an extension tube 52 of brass or other suitable material and is sealingly fixed therein, as by silver soldering or brazing at 67. The other end of the extension tube 52 is formed with a portion of reduced diameter to snugly receive one end of a coaxial type thermoelectric generator lead 53, comprising a metallic tubular outer conductor 54 and an insulated coaxial inner conductor 55. The sleeve 52 has an end recess adjacent the lead 53, and said tube and lead are sealingly and electrically connected, for example by silver soldering or brazing, at 56.

The thermocouple element means 48 preferably comprises a rod-like or cylindrical ingot of semi-metallic alloy or composition disposed in coaxial spaced relation within the sheath 49. Because the thermocouple element means 48 is of frangible material, the generator 35 is constructed in a manner to provide shock resistant mounting means therefor. The element means 48 includes an iron contact electrode 57 having a stem portion 58 formed with a shoulder 59. The tube 52 is formed with an internal annular shoulder 60, and surrounding the contact electrode stem portion 58 is an insulating washer 61 engaging the shoulder 60. Interposed between the insulating washer 61 and the stem shoulder 59 is a compression spring 62 which may take the form of a concavo-convex centrally apertured resilient disc also surrounding the electrode stem 58.

The sheath 49 is formed with a conical inner end wall surface 63, and the semi-metallic element 48 is formed with a complementary conical end wall surface 64 which is seated against the end wall surface 63. The spring 62 exerts compressive stresses on the element 48, which stresses substantially reduce the net tensile stresses to which said element is subjected during transverse acceleration or shock, said compressive stresses not being so high as to exceed the compressive strength of said element. The bias of the spring 62 also provides the pressure necessary for a satisfactory pressure contact between the element 48 and the sheath 49 at the surfaces 63 and 64. The pressure type contact is not deleteriously effected by deformation of the element 48, for example on bending under transverse shock, and the conical nature of the surfaces 63 and 64 tends to maintain the biased element 48 in centered relationship within the tubular portion 50 of the member 49. The compressive stress under which the member 48 is placed increases the magnitude of deformation which said element can withstand without fracture and affords the generator 35 substantial shock resistance.

A tube 65 of insulating material preferably surrounds the contact electrode stem 58, and a flexible conductor 66 extends within the tube 65 and affords an electrical connection between the stem 58 and the inner conductor 55 of the coaxial lead 63.

The thermocouple element 48 may, for example, be formed of a semi-metallic alloy or composition which may be characterized as a binary metallic compound of slightly imperfect composition, i.e. containing beneficial impurities constituting departures from perfect stoichiometry by reason of an excess of one of the metals over the other, and/or containing added beneficial impurity substances hereinafter referred to as "promoters." Such semi-metallic compositions have semi-conductor like conductance, both electrical and thermal, and include mixtures of such binary metallic compounds, which may be denominated ternary metallic alloys or compositions. Certain of these alloys or compositions exhibit negative and certain exhibit positive electrical characteristics.

More specifically, the thermocouple element 48 may, for example, be formed of an alloy further described in the copending application of Sebastian Karrer, Serial No. 475,540, filed December 15, 1954, now U.S. Patent No. 2,811,570, and assigned to the assignee of the present invention, said alloy comprising lead and at least one member of the group tellurium, selenium and sulphur. For example, a thermoelectric element 48 of lead-selenium-tellurium composition could include a tellurium-selenium constituent in which the selenium is but a trace. In this case such constituent should constitute from 35% to 38.05% by weight of the composition, the balance (61.95% to 65% by weight) being lead. At the other extreme, where the tellurium-selenium constituent consists almost entirely of selenium with but a trace of tellurium, such constituent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

The thermoelectric element 48 may also be formed of an alloy of lead, selenium and sulphur. For example, a thermoelectric element 48 of the lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.63% by weight) being lead. Between these two extremes the selenium-sulphur constituent varies linearly with the ratio of selenium to sulphur (expressed in atomic percent) in the selenium-sulphur constituent.

With regard to the aforementioned compositions, it will be observed that in each case there is an excess of lead over and above the amount thereof necessary for satisfying the stoichiometric proportions of the compound formed in the second constituent or constituents, i.e. the telurium, selenium or sulphur. For example, the composition consisting substantially of lead and selenium can contain up to 10.4% lead by weight of the total composition over and above the 72.41% by weight lead stoichiometrically necessary for combination with selenium.

The electrical characteristics of the aforementioned semi-metallic alloys, desirable, for example in thermoelectric elements, can be markedly and advantageously altered in a reproducible manner by the addition thereto of controlled amounts of matter other than the constituents of the base composition. Such additions may also be denominated "beneficial impurities" as distinguished from undesirable impurities. For convenience, these additions are hereinafter designated "promoters," since they tend to enhance the electrical characteristics desired for the particular application of the base composition.

The aforedescribed base compositions exhibit negative thermoelectric power and negative conductivity. By the addition of certain "promoters," such negative properties may be enhanced, while the polarity of the electrical properties of the base composition may be reversed by the addition of certain other promoters. The copending application of Robert W. Fritts and Sebastian Karrer, Serial No. 475,488, filed on December 15, 1954, now U.S. Patent No. 2,811,571, and assigned to the assignee of the present application, gives a complete description of the beneficial impurities, including both departures from perfect stoichiometry and promoters, which have been found to be effective for improvement of the electrical properties of semi-metallic thermoelectric generator elements when added to the aforementioned base compositions in minor amounts, for example up to a maximum of 6.9% by weight of beneficial impurity, including 3.9% excess lead and 3.0% promoter.

The proportions and ranges of the various constituents aforementioned and particularly the minimum limits of the lead constituent in the compositions, must be regarded as critical if the composition is to have the electrical and physical properties desired. If the lead content is significantly less than the minimum amount indicated for any particular selenium-tellurium or selenium-sulphur proportion, the polarity of the Seebeck E.M.F. changes and the desired electrical and mechanical properties will not be reproducible. On the other hand, if the lead content of any composition appreciably exceeds the aforementioned maximum limits, the resulting composition is too metallic in nature to afford satisfactory energy conversion efficiencies.

Not only are the proportions and ranges afore-described to be considered critical, but so also is the purity. More specifically, the limit of tolerable metallic impurity in non-promoted final compositions has been found to be on the order of 0.01%, and the composition must be substantially oxygen free, if the mechanical and electrical properties desired are to be obtained and are to be reproducible. In the case of promoted compositions, however, the limit of tolerable impurity is 0.001%.

In order to utilize any of the aforementioned base alloys or promoted compositions in electrical devices, for example as thermoelectric generator elements, they must necessarily be electrically contacted. As previously pointed out, electrical contact with the ingot 48 is made at one end with the inner wall surface 63 by means of a pressure contact. The electrical contact with the ingot at the opposite end, however, is made by bonding of the contact electrode 57 with the end surface of the ingot 48, and if desired, the aforementioned pressure contact can be replaced by such a bonded contact. In the latter case the element-electrode interface must have a mechanical strength at least comparable to that of the alloy of which the element 48 is made. The contact electrode must be chemically stable with respect to the element 48 and provides the necessary means for connecting said element into its electrical circuit while at the same time chemically isolating said element from the other conductors making up said circuit. Iron is especially adapted for use as contact electrode material for elements 48 of lead-tellurium-selenium compositions, and pressure type contacts of carbon are suitable for elements 48 of any of the afore-described compositions including those comprising lead and sulphur.

Since, as is well known in the art, the electrical and thermal resistance of the thermoelectric generator 35 are dependent upon the configuration thereof as well as on the electrical and thermal conductivities of the elements 48 and 49, the relationship between the dimensions of each element can be obtained which affords the highest thermal conversion efficiency in such a mounting or assembly. In the embodiment described, the thermal conductivity of the semi-metallic element 48 is low as compared with that of the element 49 (for example .025 watt/cm./° C. as compared to .261 watt/cm./° C.).

For elements of any given thermal and electrical conductivities, the conversion efficiency depends strongly upon the ratio of thickness of the sheath 49 to the radius of the element 48, or more specifically, upon the cross-sectional area of the tube. In the embodiment illustrated, this ratio of the radius of the element 48 to the thickness of the sheath 49 is preferably about 6 to 1 or more.

It is understood, of course, that the conversion efficiency of the thermocouple is also dependent upon the difference between the hot and cold junction temperatures. For thermocouples utilizing a semi-metallic inner element having a low thermal conductivity, high temperature differences can be achieved by selecting for the semi-metallic element a ratio of length to diameter, which in the exemplary embodiment herein disclosed is about 4 to 1, such that radiation transfer of heat from the surface of the inner element to the sheath establishes substantial temperature gradients within the inner element, particularly near the hot junction. When this is done, the heat flux into the inner element through the hot junction, i.e. the juncture of the faces 63 and 64, is exhausted to the case over the entire side wall surface of the inner element, allowing the inner cold junction, i.e. the juncture of the element 48 with the contact electrode 57, to assume a temperature only slightly greater than that of the outer cold junction, i.e. the juncture of the element 49 and sleeve 52. A further consequence of such radiative cooling is the reduced electrical resistance of the semi-metallic element 48, said element having a positive temperature coefficient of resistance. The radiation responsible for the removal of the heat transmitted across the hot junction takes place between the element 48, its cold junction electrode 57, and the metal walls of the element 49 and extension tube 52. Since the cold junction temperature under such circumstances is dependent upon the temperature of its environment, it is desirable to keep the ambient temperature low. The extension of the sheath to a cooler zone, as by the extension tube 16, provides a heat sink which aids in cooling the casing around the cold junctions.

The operation of the illustrated fluid fuel burning apparatus will now be described. When the temperature of the space being heated by the apparatus is above that at which the control point of the thermostat 23 is set, expansion of the fill within the bellows 24 effects separating movement of the contacts 27 and 28 sufficient to raise the contact resistance therebetween to the point where insufficient current from the generator 19 can flow to the electromagnet 13 to hold the armature 14 attracted thereto, whereupon the spring 17 actuates the armature 14 and to its retracted position and the valve member 15 to its closed position shown, thus shutting off the fuel flow to the main burner 10.

When the temperature sensed by the thermostat 23 drops below control point temperature thereof the fill within the bellows 24 contracts, and the contacts 27 and 28 are moved toward each other to decrease the contact resistance therebetween and permit sufficient current to flow from the generator 19 through the electromagnet 13 to effect attractive movement of the armature 14 and opening of the valve member 15 to permit fuel to flow to the main burner.

The fuel issuing from the main burner 10 is ignited by the flame of the pilot burner 20, and the burning fuel at the main burner heats the heat probe 51 of the generator 31 and thereby heats the hot junction at the surfaces 63 and 64 of said generator to cause the latter to generate a thermoelectric current. This current flows through the bellows 24 via the lead conductor 54, conductor 33, lugs 29 and 30, conductor 34, variable resistance element 36 and lead conductor 55 and produces a small amount of heat which provides the thermostat 23 with heat anticipation. Heat anticipation, of course, compensates for the thermal mass of the heating equipment by effecting shut-off of the main burner 10 before the ambient temperature surrounding the thermostat 23 reaches the control point temperature of the thermostat, thus preventing overshooting beyond the temperature for which the control point of the thermostat is set.

As the temperature of the thermostat fill reaches the temperature for which the control point of the thermostat is set, expansion of said fill again effects separating movement of the contacts 27 and 28 sufficient to deenergize the electromagnet 13 and effect closure of the valve member 15 for shut-off of the fuel to the main burner 10. On shut-off of the fuel to the main burner 10, heat is no longer supplied to the generator 31 by burning of fuel thereat, and said generator cools so that it no longer supplies a current to the bellows 24. As a result, the supply of artificial heat to the bellows 24 is shut off, and the thermostat 23 thereafter senses only the circumambient temperature.

The improved thermostat is characterized by its high sensitivity and low differential. The high sensitivity of the thermostat 23 makes it possible to afford heat anticipation by the small amount of heat resulting from the flow of thermoelectric current from the generator 31 through the bellows 24. The variable resistance element 36, by varying the amount of current which can flow through the bellows 24, and thereby varying the heat produced by said current, affords means for selectively adjusting the amount of anticipation afforded to the thermostat 23 by the current from the generator 31. This renders the improved thermostat adaptable to the thermal mass of the particular heating equipment with which it is used.

Having thus described one embodiment of the present invention, it is to be understood that the illustrated form was selected to facilitate the disclosure of the invention, rather than to limit the number of forms which it may assume. Various modifications, adaptations and alterations may be applied to the specific form shown to meet the requirements of practice without in any manner departing from the spirit or scope of the present invention, and all of such modifications, adaptations and alterations are contemplated as may come within the scope of the appended claim.

What is claimed as the invention is:

In self-powered heat control apparatus comprising a main fuel burner and an ignition fuel burner therefor, electroresponsive control means energizable to permit fuel flow to said main burner and deenergizable to prevent fuel flow thereto, a first thermoelectric generator for energization of said electroresponsive means responsive to a flame at said ignition burner, switch means responsive to heat afforded by said main burner and comprising cooperating contacts in circuit with said electroresponsive means and said first generator for control of energization of said electroresponsive means by said generator, said switch means comprising an hermetically sealed expansible and contractible enclosure for said contacts having an electrically conductive portion of predetermined electrical resistance, and a second thermoelectric generator positioned to be subjected directly to a flame at said main burner and connected to pass an electrical current through said electrically conductive enclosure portion for creation of heat affording said switch means anticipation of the heat afforded by said main burner in controlling energization of said electroresponsive means by said first thermoelectric generator.

References Cited in the file of this patent

UNITED STATES PATENTS

| | | |
|---|---|---|
| 1,422,802 | Whittingham | July 11, 1922 |
| 1,612,246 | Whittingham | Dec. 28, 1926 |
| 1,822,408 | King | Sept. 8, 1931 |
| 2,280,353 | Ray | Apr. 21, 1942 |
| 2,456,907 | Berberich | Dec. 21, 1948 |
| 2,717,123 | Hilgert et al. | Sept. 6, 1955 |
| 2,737,555 | Hilgert | Mar. 6, 1956 |